United States Patent [19]

Smith

[11] 4,302,933
[45] Dec. 1, 1981

[54] JET ENGINE AUGMENTOR OPERATION AT HIGH ALTITUDES

[76] Inventor: Marvin M. Smith, 1010 E. Parkway Dr., Muncie, Ind. 47304

[21] Appl. No.: 144,634

[22] Filed: Apr. 28, 1980

Related U.S. Application Data

[63] Continuation-in-part of Ser. No. 16,625, Mar. 1, 1979, abandoned, which is a continuation-in-part of Ser. No. 840,491, Oct. 7, 1977, abandoned.

[51] Int. Cl.³ .............................................. F02K 3/10
[52] U.S. Cl. ................................ 60/261; 60/39.82 R; 431/2; 431/263
[58] Field of Search ................... 431/1, 2, 6, 258, 263; 60/39.76, 39.82 R, 39.06, 212, 749, 261, 39.82 S, 256

[56] References Cited

U.S. PATENT DOCUMENTS

| | | | |
|---|---|---|---|
| 3,002,351 | 10/1961 | Sloan | 60/749 |
| 3,427,118 | 2/1969 | Andress et al. | 431/258 |
| 3,473,879 | 10/1969 | Berberich | 431/1 |
| 4,035,131 | 7/1977 | Cerkanowicz | 431/6 |

Primary Examiner—Edward G. Favors
Attorney, Agent, or Firm—Rummler & Snow

[57] ABSTRACT

In the operation of an air atomized jet engine augmentor oil burner, the herein disclosed improvement typically comprises a means for modulating the fuel-air ratio of the wake combustion in the jet engine augmentor according to ambient pressures and densities of the supplied air to that ratio which will sustain the highest wake combustion thermal efficiency, and in the process to vaporize and ignite the fuel-air mixture therein instantly and completely into an intense and turbulent flame spread.

My method of doing this is to create unusually intense combustion activities resulting from the energy input of controlled high energy pulsed laser beam or beams directed into the forward area of the recirculation zone of the augmentor to ignite and explode fuel droplets therein; the said combustion activities to be of sufficient power and turbulence to change the normal aerodynamics of the flame-holder aerosol flower in such a manner as to alter their reaction kinetics favorably and thereby cause a bypass of a predetermined portion of the normal fuel drop-ins by adjusting the frequency of the laser beam pulses directed into the said recirculation zone. The procedure here is to measure the density (pressure) of the ambient air and convert this into corresponding predetermined laser pulse frequencies to control the amount of fuel captured in the recirculation zone and thereby attain the wake combustion fuel-air ratio desired for the operating altitude.

4 Claims, 2 Drawing Figures

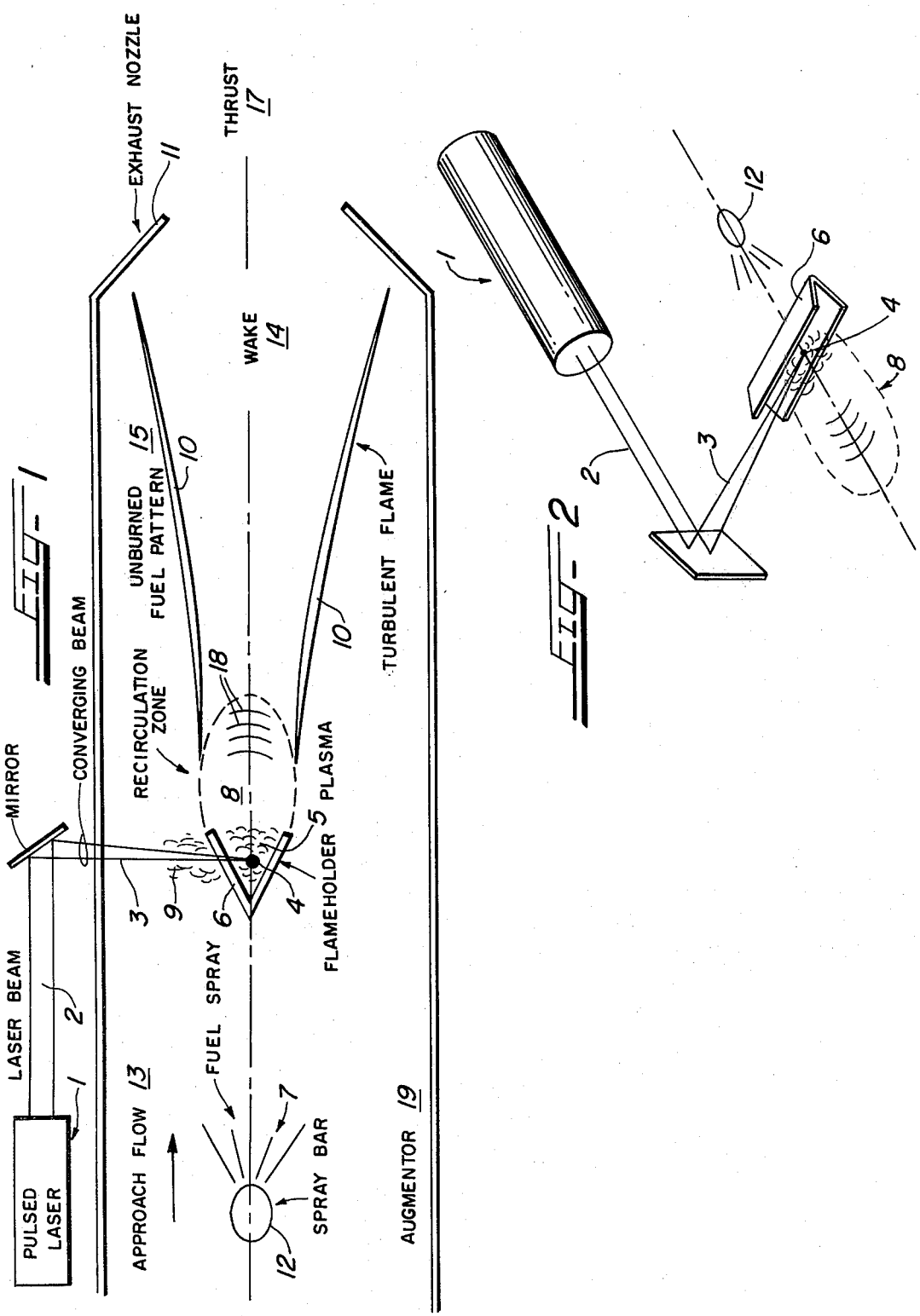

JET ENGINE AUGMENTOR OPERATION AT HIGH ALTITUDES

BACKGROUND OF THE INVENTION

This application is a continuation-in-part of my copending application Ser. No. 16,625, filed Mar. 1, 1979, now abandoned, which in turn was a continuation-in-part of my application Ser. No. 840,491 filed Oct. 7, 1977, now abandoned.

With the introduction of military augmented turbo-fan engines, manufacturers became involved in the problems of very low frequency instability. The problems of these low frequencies, called rumble, have been reduced through combined experimental and analytical techniques. This experience has emphasized the necessity of understanding the fundamental mechanisms involved in order to formulate a meaningful analytical effort and the necessity to relate this effort into hardware and processes.

The problem of solving low frequency instability has been time consuming but for rumble, the development problem is even more time consuming since rumble usually occurs only at high altitude, low flight Mach number operations.

Analytical and experimental studies have repeatedly been made to determine the response of augmentor flameholders and their following wakes which generally have been considered the source of the major problems resulting in rumble, and to velocity and pressure oscillations typical of low frequency instabilities, as found in flights of high and low altitudes in varied Mach numbers. These readings further concluded that the cause of increased rumble sensitivity was identified with increases of fuel-air ratio and approach flow severity was identified with a decrease in wake reaction efficiency and flame speed. It is also concluded as a result of these many studies that the following can, in general, reduce instabilities that father rumble:

Wake heat addition
Decrease wake fuel-air ratio
Increase turbulence level
Increase fuel vaporization With this background of knowledge, I have developed the following equipment and processes to eliminate operating rumble.

My invention is here directed to the method and equipment necessary for solving the problem of rumble reduction or elimination in the augmentor combustion of a jet airplane power plant which has been experienced as a result of low frequency instabilities at certain altitudes and Mach numbers.

SUMMARY OF THE INVENTION

My approach to solving this serious problem is first to recognize what are generally accepted to be the conditions that are connected with creating this condition. Other than design problems, it is generally accepted that the problem of reducing instability in the augmentor combustion is pretty much based on fuel-air ratios, fuel distribution, fuel droplet size, droplet vaporization by the flameholder, reducing fuel-air ratio in the wake stream, ignition of fuel-air mixture in the wake, turbulence at the point of combustion to excite the flame therein and continued turbulence in the wake flame front to give it transversal penetration into the unreacted free stream.

To understand how the above are involved in the overall problem, we must realize that the total energy derived in the thrust at the nozzle is gained from the energy in the fuel burned in the core and augmentor combustion. This energy is used to expand and accelerate the compressed air that propels the turbine that turns the compressors and fans that feed air to the core engine and the augmentor, and each step has its specific function.

The problems we are specifically addressing here are those that come from combustion in the turbo-fan jet augmentor of the power plant. In order to ignite and burn the tremendous amount of input fuel efficiently in the time and area allowed therein, streams of intensely hot flame fronts have to penetrate the mass of free fuel-air mixture in the augmentor. These streams are fueled by the same jet fuel as the general input and to ignite it under certain conditions requires special help in vaporization and ignition. To do this, a metal flameholder of predetermined design is placed in the downstream area of the fuel-air droplet pattern at a proper distance from the fuel spray to accumulate a share of the droplets on its surface. Due to the geometry and the position of the flameholder in the exhaust stream of the core engine, it is warm to hot which enables the fuel droplets it contacts to vaporize. As this fuel vapor and input air flows over the flameholder, the mixture is ignited in the recirculation zone to form into an intense flame, which is known as the wake, and which now becomes one of the pilots for ignition of the overall free stream of fuel droplets and air in the augmentor area just upstream from the exhaust nozzle. To achieve its purpose, the wake's turbulent shear edges have to fan out and penetrate laterally to properly vaporize and ignite the free stream fuel-air mixture into an efficient combustion for thrust. As the temperature of the wake products is reduced, the percentage of the area that fails to ignite increases.

To complicate the problems herein addressed, the vehicle in which the augmentor is operating has to function at all altitudes and at various Mach numbers. Rumble tendencies, which we are herein addressing, follow classic lines of combustion instability behavior. That is, any change which reduces the velocity or pressure sensitivity of the combustion process or increases the damping factor will reduce instability. The behavior of the core streams follows the classic curves of efficiency versus fuel-air ratio for gaseous fuels. The peak efficiency fuel-air ratio is not at stoichiometric but rather at 0.055. This shift is caused by the vitiation of the turbine exit flow due to the main burner combustion. It appears that the core stream efficiency is quite good up to very high altitudes; however, the analysis for the fan duct stream augmentor combustion shows results in quite different behavior. The efficiency shows a sharp climb from the lean limit and a plateau of efficiency for some range of fuel-air ratios—followed by a sharper fall toward a rich blowout. Also, significant decline occurs above 50,000 ft. at typical mach numbers.

Two factors contribute to the rapid decline in efficiency from 50,000 to 55,000 ft. The reduced static pressure in the augmentor increases the rate of fuel vaporization from the surface of the flameholder for a given level of wake heat flux; also, the reduced pressure results in a decrease in the wake rich limit fuel-air ratio. Thus a richer wake with a leaner rich limit yields earlier blowouts at high altitudes and these blowouts often result in stall and stall stagnation.

From published research, it has been observed that the real ignition of the total free fuel-air mixture in the augmentor, which is better than 90 percent of the total injected energy, is accomplished by the wake combustion which has its source in the recirculation zone just aft of the flameholder and it is here that by proposed method and equipment come to the aid of present burner procedures to establish and assure its stable and effective combustion so as to ignite the total free fuel-air mass.

The injected laser energy distributed into the recirculation zone in the form of heat as initiated by laser-supported absorption (LSA) waves is included only as a preferred part of this process because normal high energy laser beams emit their energy in spot areas which limits their efficacy, while LSA waves, used as herein specified and described, are initiated by the laser beam reflecting off of targets, such as fuel droplets in the eye of the cyclonic air action in the recirculation zone just aft of the flameholder to emit therein electrons which serve as priming electrons to break down air into plasma of intense heat (10,000° to 20,000° K) which can cover all the area reached by the beam in the recirculation zone wherever there are targets or fuel droplets to initiate them. Intense heat is now emitted by the spread of intensely hot plasma which gives greater effective coverage for ignition than would be available by the laser beam alone.

An illustration of this is to compare it with a bolt of lightning. When the electrons of electricity in a lightning bolt head for the ground, a glow is seen where it had been but the electrons themselves hit the ground at one small point. However, as it progressed from its source to its target, the electrons which made up the bolt broke down air molecules in its path into plasma and this plasma hangs and glows in its intense heat to be observed after the pulse of lightning has long gone. Here the target of the electricity was small but miles of intensely hot plasma hung where the bolt had been.

It is well here to explain laser-supported absorption (LSA) waves and their formation. They can be initiated by typically directing a 10.6 micron wavelength converging beam of a minimum density of $6 \times 10^8 W/CM^2$ from a pulsed laser, typically a $CO_2$ TEA type, wherein electrons are emitted from reflecting off of fuel droplets or from the surface defects of a target, said electrons to serve as priming electrons for an air breakdown which proceeds via inverse bremsstrahlung heating. Here a hot air plasma (1-2 ev) is formed which propagates back up the laser beam away from the formed plasma where most of the laser beam energy is absorbed. This phenomenon can reach temperatures of great intensity in micro-seconds. Extensive research has been done in this area for the United States Missile Command and published in an unclassified report by Dr. C. T. Walters, et al., Battelle, entitled, "An Investigation of Mechanism of Initiation of Laster-Supported Absorption (LSA) Waves," to which I am referring above.

The F100 PW100 engine used in the F15 and F16 fighters as delivered today is an excellent instrument and under normal operating conditions its augmentor burner functions quite satisfactorily. The problems that do occur in its operation come from the fact that it must function under a variety of conditions, most of which are associated with high altitude flight. In this envelope of flight air densities for augmentor wake combustion are reduced which can create or exaggerate unfavorable flameholder kinetic reactions and allow excessive fuel to accumulate in the recirculation zone and thus create conditions not conducive to stable wake combustion. The results of these operating conditions can be rumble, blowout, stall or stall stagnation of the entire power plant; all of this because there is currently a blank spot in the treatment of the kinetic reactions of the flameholder aerosol flow-over and its effect on the accumulation in the recirculation zone. This can be corrected by establishing and maintaining a proper fuel-air ratio, for each altitude of flight, in the recirculation zone as herein disclosed to stabilize the combustion of the wake pilot streams so they will effectively penetrate the total free fuel-air mixture in the augmentor to instantly and completely ignite it into combustion at the operating altitude.

To do this is the purpose of the present invention. It involves injecting laser energy in the form of laser-supported absorption waves' plasma into the flameholder recirculation zone to ignite a sufficient portion of the droplets therein to create explosive ignition and thus enhance the wake combustion by favorably altering the flameholder reaction kinetics sufficiently to limit the fuel drop-ins and enable the adjusting of the fuel-air ratio to its highest thermal efficiency for that altitude of flight and then to re-ignite this total mixture into a penetrating hot wake.

Since the altering of the flameholder reaction kinetics is accomplished by periodic explosive ignition of a portion of the ignited fuel droplets in the recirculation zone aerosol and since leaner fuel-air ratios are demanded for maximum thermal efficient combustion as the altitude of flight increases and air densities decrease, factors such as pressures, gas, velocities, etc., created by the explosive laser pulse ignition of fuel droplets must be adjusted to air densities in controlled frequencies; the less dense the air the more need to restrict the fuel drop-ins into the recirculation zone, and hence the greater the pulse frequency required per given time, e.g. 30,000 ft. altitude, 1 pulse per sec.; above 55,000 ft. altitude, 9 pulses per second, giving a pulse frequency range of 1–9 per second. This pulse range is determined by the hang time of the laser-supported absorption (LSA) waves' plasma to effectively perform its functions in this process at various altitudes and under various conditions.

Using the augmentor flameholder of the F100 PW100 engine as an example for type and size, ignition in this process for its total wake combustion will be treated in quarters with four converging laser beams spraying light and then hot plasma wherever it contacts fuel droplets in the recirculation zone.

Further on this point and to show why it is imperative to adjust the fuel-air ratio of the wake combustion from the over-all free fuel-air ratio of 0.055 to the fuel-air ratio of the ambient air density, at least at high altitudes, reference is made to FIG. 81 on page 109 of the Pratt and Whitney Aircraft Group publication "Flameholder Combustion Instability Study." It will be noted that this chart shows clearly why proper wake fuel-air ratios are so important to stable combustion and why, unless adjustments are made, rumbles, stalls and stall stagnations can be experienced in high envelope flight when the augmentor is in action.

As this chart shows, at 50,000 feet, the maximum augmentor duct thermal efficiency is attained at a fuel-air ratio of 0.034 and reduces rapidly to the blowout limit as the ratio increases to 0.07. At 55,000 feet, the duct thermal efficiency peaks at the same fuel-air ratio of 0.034 but reaches the blowout limit abruptly at 0.038.

It is important here to explain that while a fuel-air ratio of 0.034 is recorded for maximum thermal efficiency for wake combustion at all altitudes 50 K and over, this is based on the amount of fuel necessary to mix with the air at that density. As air densities decrease because of increased altitudes, oxygen available for combustion decreases and in order to maintain this ratio the fuel in the mixture must be reduced accordingly, i.e. the 0.034 ratio at 55 K must contain less fuel by weight in its mixture than 0.034 at 50 K although the proportions are the same. To correlate this information to my method of achieving the most efficient fuel-air ratio is to create an unusually intense combustion activity in this area so as to change and redirect a portion of the aerodynamics of the gases and fuel directly aft of the flameholder flow-over and thus restrict the drop-ins and hence the accumulation of the fuel in the wake mixture. As stated above, the intense combustion activity to do this results from the explosive ignition of the fuel droplets in the forward area of the recirculation zone in contact with hot (10,000°–20,000° K) plasma formed by the air breakdown by LSA waves. Various additives may be used in conjunction with the fuel and the laser beam or beams to assist in this process. The pulse frequency to accomplish this result may be mechanically regulated by a simple bellows altimeter connected with a laser ignition circuit, the altimeter to record ambient pressure and the laser ignition circuit to correlate these findings into appropriate pulse frequencies.

It is obvious from the above that when flying in the 50 K plus area, rumble and blowouts of augmentor combustion can be totally eliminated by maintaining the proper fuel-air ratio for the wake combustion. To again emphasize, I do this by regulating the number of laser pulses per unit of time as above disclosed to (1) limit the amount of fuel drop-ins into the recirculation zone by artificial combustion action to enhance combustion of wake by favorably altering the flameholder reaction kinetics created therein, (2) reduce the fuel-air ratio of the wake combustion by drawing in air from the 0.055 fuel-air ratio of the free fuel-air mixture by the kinetic forces of the vacuums created in the wake of the fuel droplets' explosions as they ignite in the recirculation zone, and (3) control the extent to which this fuel-air ratio is reduced by controlling the number of laser pulse injections per given time so as to hold the fuel-air to the proper ratio to attain the maximum thermal efficiency of the wake combustion at that altitude. To further assist in this procedure for achieving and maintaining the desired fuel-air ratios in the wake combustion is the added contribution of the phenomenon of the reverse flow of the LSA plasma back up the laser beam from the targets creating vacuums in their wakes to bring in air from the free fuel-air mixture. These made happenings all combine to effect the frequency of laser pulses necessary to control fuel-air ratios.

Reference is made to FIGS. 82 and 83 appearing on page 110 of the before mentioned Pratt and Whitney publication, FIG. 82 showing the F100 engine augmentor's predicted efficiency vs. fuel-air ratio and also showing why the overall ratio used is 0.055, just slightly richer than the indicated maximum efficiency; and FIG. 83 showing the effect on Duct Thermal efficiency of heat addition to the wake. As ambient air densities and temperatures decrease due to high altitude flights, FIG. 83 shows how greatly additional heat increases the thermal efficiency of the wake combustion (about 16 percent at 55 K) and this affects the ability of the wake combustion to function as a combustion pilot for the free fuel-air mixture in the augmentor combustion chamber. Bearing in mind that as the temperature of the wake products is reduced, the percentage of the area that fails to ignite increases, my method involves directing a laser beam or beams pulsing at a predetermined frequency from outside the augmentor combustion chamber, the intrusion of which will in no way obstruct or affect the normal flow of fuel-air patterns or combustion movements, into specific spots in the aft area of the flameholder of the currently designed augmentor (see FIGS. 1 and 2 of the drawing) in such a manner as to initiate LSA waves with their accompanying air breakdown plasma, the thermal emissions therefrom to (1) vaporize and ignite the fuel-air mixture in the recirculation zone of the flameholder wake,
(2) add additional heat to the flameholder by creating increased radiation from the recirculation zone, and
(3) add additional heat to the wake combustion.

The equipment necessary in the use of this invention as an aid in jet engine augmentor combustion should be coupled with a system to automatically or manually activate its functioning and regulate the laser pulse frequency. Typically it could be automatically activated to operate by a pressure mechanism at 40,000 ft. altitude since above that is the envelope in which most of the rumble is experienced, and automatically shut off when reaching a lower altitude; however, this also could be so arranged that it could be activated manually or automatically at any time and altitude. The laser should be so harnessed in or on the power plant to avoid excessive heat radiation therefrom and to withstand vibration. Typically it could be located in the fan duct passage with beams properly directed to the focal points in recirculation zones so as to avoid the use of windows in the openings where the beam enters the combustion chamber because of plus pressure differentials from duct to combustion chamber. Any typically, energy to activate the laser or lasers can be from special power sources, such as thermal electric generators, designed for this load.

BRIEF DESCRIPTION OF DRAWING

FIG. 1 is a schematic and partly sectional view of a typical arrangement of apparatus for practising the present invention, the converging laser beam and its souce being shown, for descriptive purposes, as rotated 90° about the system axis, from its operative position; and FIG. 2 is a diagrammatic view illustrating the operating relation of the converging laser beam and the flame holder.

THE PREFERRED EMBODIMENT

As shown in the drawings, my invention embodies a radiant energy beam 2-3 from a laser 1 directed onto a fuel droplet or target 4 directly downstream of flameholder 6 in the recirculation zone 8 to form an air breakdown and plasma with LSA waves 5 to emit therefrom thermal emissions to vaporize fuel from spray bar 12. A portion of the fuel spray 7, as droplets therefrom, is vaporized by contact with flameholder 6 and moves along with some of the combustion air 13 into the recirculation zone 8 to ignite and to form wake 14 with its turbulent hot shear edges 10. Thermal emissions from plasma and LSA waves 5 along with the combustion heat of the wake 14 and recirculation zone 8 increases the temperatures of flameholder 7 and along with air from approach flow 13 ignites the activants into the combustion of wake 14 which is now the pilot for igniting the unburned fuel-air pattern 15 into overall combustion to turn the energy created thereby into thrust 17 as it forces its way through the exhaust nozzle 11.

In addition to the energy developed from combustion created by heat emissions from LSA waves and plasma 5 in the recirculation zone 8, igniting combustion for wake 14, shock waves 18 are created as a reaction to the intense ignition actions and these shock waves cause active turbulence in the recirculation zone 8 which carries out through the entire wake 14. When LSA waves and plasma 5 contact fuel droplets 7 and air 13 in the recirculation zone 8, intense eruptions or explosions occur, the action of which creates intense outward pressures on the aerosol flow-over of the flameholder 6 changing its usual aerodynamics and altering favorably its reaction kinetics and thus control the amount of fuel drop-ins drawn into the recirculation zone 8. By measuring the ambient air pressure by an altimeter and directing its findings to a circuit controlling the laser beam pulse 3 frequencies, the appropriate frequencies are determined and executed into the recirculation zone 8 to achieve desired fuel-air ratios for the wake 14. These same intense ignition actions in the recirculation zone 8 create vacuums in their own wakes which by their kinetic energy draw in air from the unburned fuel-air pattern 15 into the fuel-air ratio for the combustion of wake 14 which is so essential to its proper combustion because of its abnormal accumulation of fuel vapor and droplets in the recirculation zone 8 in the low density air at high altitudes.

There have been countless efforts to develop a means of achieving stable combustion in high envelope flights, most aimed at a means of extending this stability at higher fuel-air ratios. My approach is to avoid the futility of that effort and instead automatically adjust the fuel-air ratio to the level which attains the highest thermal efficiency of the wake combustion at that altitude, which at 55 K is approximately 0.034 (see Chart A), by the simple process of increasing or decreasing the laser pulse frequency into the eye of the cyclonic aerosol movement in the flameholder recirculation zone 8, as herein described, to enhance its combustion by favorably altering its reaction kinetics and thus eliminate the current problems now evident in high envelope flight by removing their causes.

While this is the core of my invention, the procedures of doing contribute other definite pulses to wake and overall augmentor combustion, such as (1) increasing the temperature of the flameholder, (2) adding heat to the wake, (3) increasing turbulence in the wake, and last but not least, (4) assure instant and complete ignition of the fuel-air mixture of the wake; each and all of which are imperative to efficient and stable combustion.

Although but one specific embodiment of this invention has been herein illustrated and described, it will be understood that details of the arrangement shown and the apparatus and method described may be altered or omitted without departing from the spirit of this invention as defined by the following claims.

I claim:

1. In the operation of a jet engine augmentor, a method for stabilizing combustion at high altitudes which comprises directing a beam of radiant energy pulses into the aerosol of fuel droplets in the recirculation zone of the augmentor, the said radiant energy beam being of sufficient intensity to ignite the fuel droplets engaged thereby, measuring the ambient pressure of the atmospheric envelope in which the augmentor is operating, and varying the frequency of the radiant energy pulses in direct relation with variations of the ambient atmospheric pressure, whereby the fuel-air ratio in the wake combustion is continuously maintained at a high thermal efficiency.

2. For stabilizing combustion in a jet engine augmentor operating at high altitude and varying ambient atmospheric pressures, a system comprising means for producing and directing a beam of pulsing radiant energy into the aerosol of fuel droplets in the recirculation zone of the augmentor, said radiant energy beam being of sufficient intensity to ignite the fuel droplets engaged thereby, means for sensing variations in the ambient atmospheric pressure of the envelope in which the augmentor is operating, and means responsive to said ambient pressure sensing means for varying the frequency of the radiant energy pulses in direct relation with variations of the said ambient pressure, whereby the fuel-air ratio of the wake combustion is continuously maintained at high thermal efficiency.

3. The jet engine augmentor combustion stabilizing system defined by claim 2 wherein the means for producing the pulsing radiant energy beam is a laser device.

4. The jet engine augmentor combustion stabilizing system defined by claim 2 wherein the means for sensing variations of the ambient pressure is an altimeter, and the means responsive to the said sensing means for producing a pulsing radiant energy beam is a laser device.

* * * * *